United States Patent [19]
Ovard

[11] 3,780,567
[45] Dec. 25, 1973

[54] DRIFT MEASUREMENT SYSTEM
[75] Inventor: John C. Ovard, Santa Rosa, Calif.
[73] Assignee: Ecodyne Corporation, Chicago, Ill.
[22] Filed: Mar. 17, 1972
[21] Appl. No.: 235,484

[52] U.S. Cl. .............................. 73/28, 73/421.5 A
[51] Int. Cl. ............................................. G01n 1/22
[58] Field of Search ........................ 73/28, 421.5 A

[56] References Cited
UNITED STATES PATENTS
2,353,828   7/1944   Hyde.................................. 73/28 X
FOREIGN PATENTS OR APPLICATIONS
927,271   5/1963   Great Britain ................. 73/421.5 A

*Primary Examiner*—Jerry W. Myracle
*Attorney*—Charles M. Kaplan et al.

[57] ABSTRACT

A drift measurement system to quantitatively measure the drift emitted from a cooling tower. The drift measurement system includes: sample collecting means for collecting test samples from various points in the fan stack exhaust air; isokinetic sampling control means to insure that the drift particles collected are truly representative of those entrained in the exhaust air; cyclone separator means for separating the liquid or solid particles from the test sample; and container means for receiving the separated liquid or solid particles.

11 Claims, 5 Drawing Figures

PATENTED DEC 25 1973

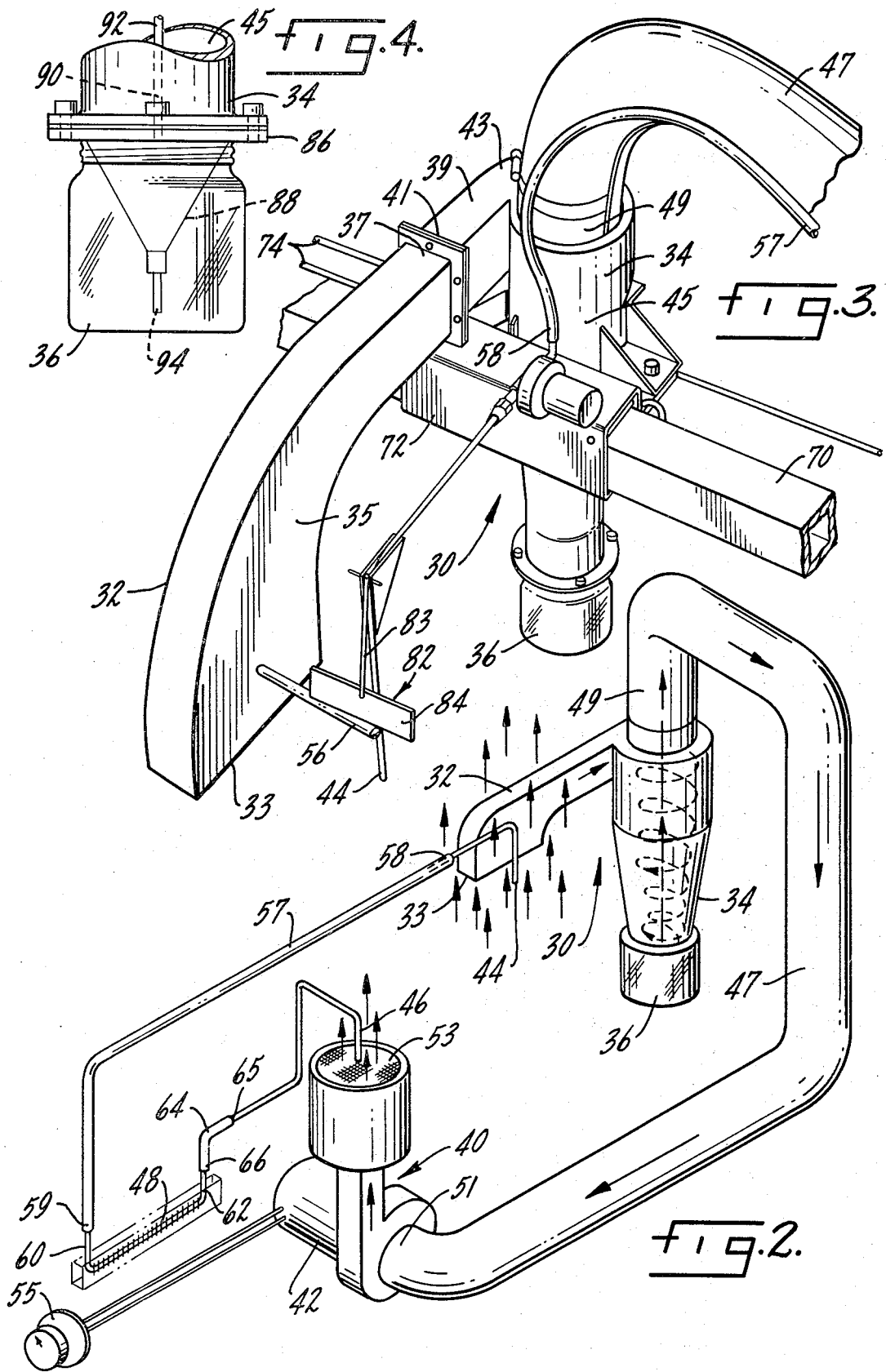

DRIFT MEASUREMENT SYSTEM

BACKGROUND OF THE INVENTION

This invention relates to a method for and a drift measurement system to quantitatively measure the drift emitted from a cooling tower.

Cooling tower drift has been traditionally defined as mechanically entrained droplets which are carried along with the air passing through a cooling tower and exhausted to the environment. Based on this definition, one would expect these water particles to have essentially the same chemical composition as the circulating water in the cooling tower. However, the basic evaporative process in a cooling tower results in airborne solid salt particles since smaller droplets evaporate completely. Thus, solid particles or water particles with salt concentrations higher than the composition of the circulating water are also exhausted to the atmosphere. These particles cannot be overlooked in evaluating drift and its environmental effects since they are also potentially detrimental to the environment. This is particularly important with the advent of salt or brackish water cooling towers because of recent attention focused on drift as a potential danger to local vegetation or as an air pollutant. Experiences with cooling towers currently operating with salt water indicate that problems of this nature do not occur. However, due to a lack of quantitative information on drift levels and the expected use of much larger salt water cooling tower units than are currently operating, definitive proof is essential.

Several techniques have been developed for the discriminate measurement of small airborne water particle size and quantities in the range of those encountered in cooling tower drift. Most of these methods have evolved from meterological investigations on clouds, fog and precipitation. The two major problems inherent in such techniques are the difficulty of collecting a representative sample and the maintenance of the droplet size long enough for measurement. One method, which is potentially applicable to cooling tower drift measurement work, uses glass slides coated with a material which preserves the impression water particles make on impact with the slide. The impressions can be examined later under a microscope to determine their size. For this technique to give accurate results, the relationship between the impression on a slide coating must be correlated with the impacting water particle size. Another technique developed to determine particle size bases its particle measurement ability on diffraction rings or coronas produced when high intensity light is scattered while passing through water droplets entrained in the air. This method has limited application since difficulties are encountered when trying to measure particles with diameters smaller than 50 to 60 microns because of the very small Raleigh scattering range.

All of the above techniques, while having the advantage of discriminate measurement of particle size, have two serious limitations when applied to the field measurement of cooling tower drift. Firstly, the sampling times with these methods are necessarily extremely short; usually in the range of a few seconds or fractions of a second depending on the method. To obtain a truly representative measurement of cooling tower drift requires that a large number of samples be analyzed to reflect a true statistical average of particle size and emission rates. The problem is further complicated by the extreme variability of particle size which occurs in cooling tower drift. In addition, the exhaust velocity, temperature, relative humidity and drift particle size will vary both as a function of time and position. This can result in variation of water particle size due to condensation and/or evaporation. Secondly, the techniques described above have no way of adequately accounting for operational variations, and futher, the chemical composition of the drift droplets sampled is unknown.

SUMMARY OF THE INVENTION

The method and apparatus of the present invention overcomes these limitations since it does not measure particle size, but extracts a continuous isokinetic sample from the cooling tower exhaust air along with the associated drift particles.

It is a primary object of the present invention to provide a method and apparatus for quantitatively measuring the drift emitted from a cooling tower.

Another object is to provide a method and apparatus for accurately collecting a drift sample which represents the total average drift emitted from a cooling tower.

A further object of the invention is to provide a method and apparatus for quantitatively measuring the drift emitted from a cooling tower which permits chemical analysis to determine the dissolved solid content of the drift.

Still another object is to provide a drift measurement system for measuring the drift emitted from a cooling tower which can be moved to collect samples from various parts of the fan stack and is adaptable to most sizes of cooling tower fan stacks.

The drift measurement system of the present invention includes: sample collecting means for collecting test samples from various points in the fan stack exhaust air; isokinetic sampling control means to insure that the drift particles collected are truly representative of those entrained in the exhaust air; cyclone separator means for separating the liquid or solid particles from the test sample; and container means for receiving the separated liquid or solid particles. Mono-rail means are releasably secured to the fan stack to support and guide the sample collecting means and thereby permit same to be positioned to collect samples at pre-selected locations in the exhaust air.

BRIEF DESCRIPTION OF THE DRAWINGS

Other objects and many of the attendant advantages of this invention will be readily appreciated as the same becomes better understood by reference to the following detailed description when considered in connection with the accompanying drawings, in which like reference numerals designate like parts throughout the figures thereof and wherein:

FIG. 2 is a schematic representation of the drift measurement system of FIG. 1;

FIG. 3 is an enlarged perspective view of the sample collecting apparatus of the drift measurement system of FIG. 1;

FIG. 4 is an elevational view of the collecting jar; and

DESCRIPTION OF A PREFERRED EMBODIMENT

Figure 1:
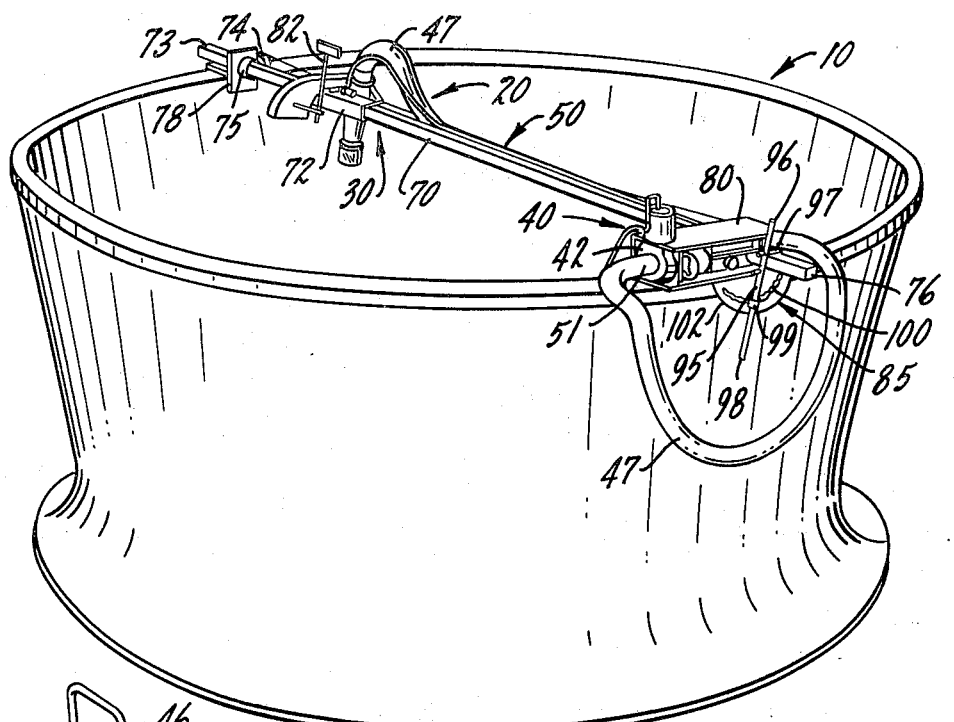
FIG. 1 is a perspective view of a typical cooling tower fan stack equipped with the drift measurement system of the present invention.

Referring to FIG. 1, a cooling tower fan stack 10 is shown having a drift measurement system 20 of the present invention secured to the upper rim thereof. Drift measurement system 20 includes sample collection apparatus 30, isokinetic control apparatus 40, and mono-rail apparatus 50. Sample collection apparatus 30 traverses the fan stack discharge on mono-rail apparatus 50 and extracts representative samples from various positions in the plane of the fan stack discharge. Control apparatus 30 insures that the extracted sample of drift particles are truly representative of those entrained in the exhaust air at the sampling point.

Referring to FIG. 2, a schematic representation of sample collection apparatus 30 and isokinetic control apparatus 40 are shown as including a sample collector 32, a cyclone separator 34, a collection jar 36, a blower 42, a sample velocity probe 44, a system velocity probe 46 and a manometer 48. Sample collector 32 is positioned at the point to be measured such that the plane of the inlet is positioned perpendicular to the direction of the sample point air flow. The drift sample which enters collector 32 is directed into cyclone separator 34 where the entering liquid and solid particles are separated from the exhaust air by centrifugal force and collected in collection jar 36. In order to insure that the drift particles which enter collector 32 are truly representative of those entrained in the exhaust air at the sampling point, the velocity at the collector inlet must be maintained close to the natural velocity of the cooling tower exhaust air to avoid particle discrimination. The adjustment to this isokinetic condition is attained by varying the speed of the centrifugal blower 42 until the total pressure measured adjacent the collector inlet by probe 44 and the total pressure measured at the blower discharge by probe 46 are in balance. Any imbalance is detected by manometer 48.

Referring to FIGS. 2 and 3, sample collection apparatus 30 includes a hollow sample collector member 32 having an inlet 33, a sample directing passageway 35, and an outlet 37. Secured to outlet 37 of collector 34 is a tubular member 39 defining a passageway therethrough having a first end 41 secured to and in communication with outlet 37 and a second end 43 secured to and in communication with cyclone separator 34. Cyclone separator 34 is of conventional structure having an inner chamber 45 where the particles of the exhaust air-drift mixture are centrifugally forced to the separator walls causing them to flow downward into a collection jar 36 secured to and in communication with the bottom of chamber 45. A flexible conduit 47 has a first end 49 secured to and in communication with the upper end of chamber 45 and a second end 51 secured to the inlet of blower 42. Blower 42 is effective to draw the exhaust air from chamber 45 through conduit 47 into blower 42 and then to atmosphere through blower outlet 53, as indicated by arrows in FIG. 2.

Figure 5:
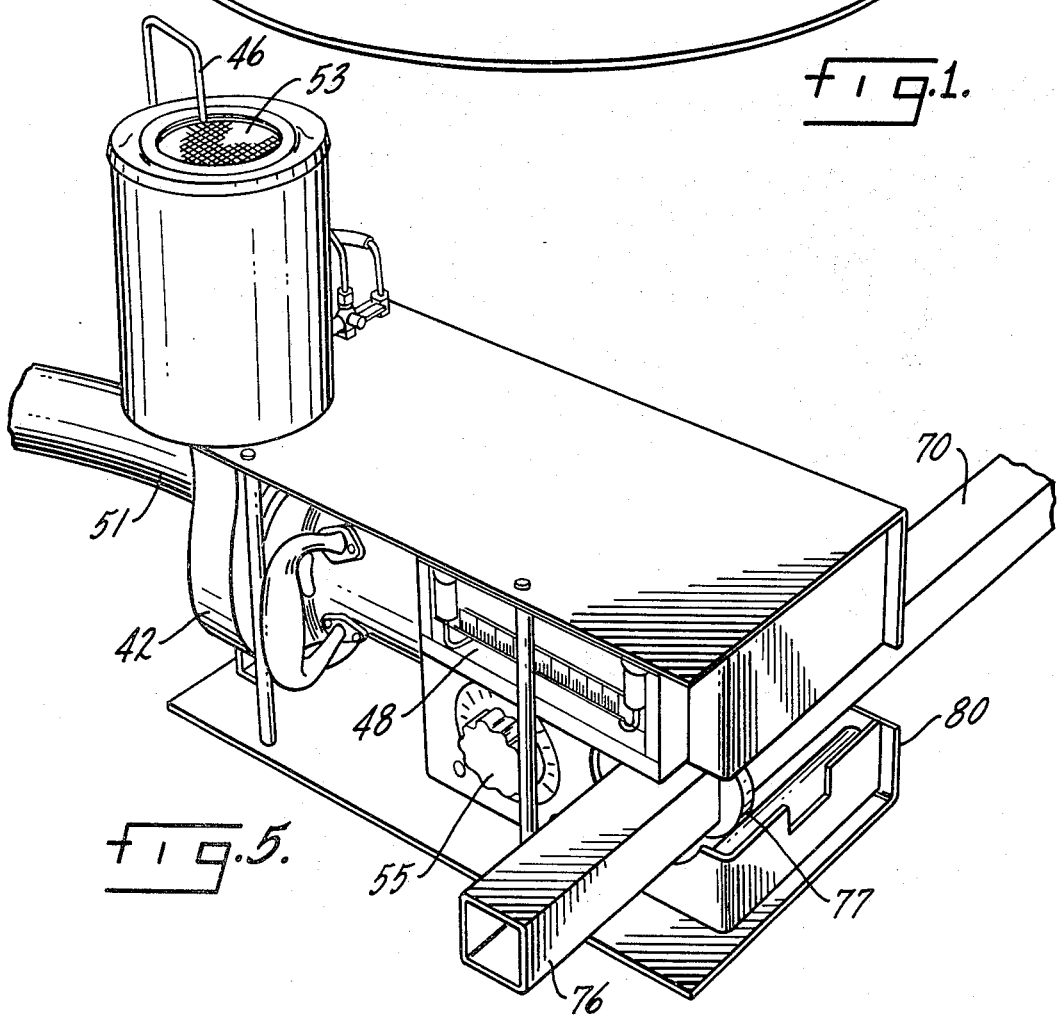
FIG. 5 is an enlarged perspective view of the control apparatus of the drift measurement system of FIG. 1.

Referring to FIGS. 2, 3 and 5, isokinetic control apparatus 40 includes a pair of velocity measuring probes 44 and 46, an inclined manometer 48 and a variable speed blower control assembly 55. Probe 44 is positioned adjacent inlet 33 of collector 32 and vertically extends downward parallel to the direction of exhaust air flow, indicated by arrows in FIG. 2, to measure total pressure adjacent inlet 33. Probe 44 is secured to collector 32 to permit movement therewith by rod 56, connected at its opposite ends respectively thereto. Probe 44 is of the conventional total pressure type and includes pressure transmission tubing 57 having a first end 58 secured to probe 44 and a second end 59 secured to a first end 60 of manometer 48. A second total pressure probe 46 is positioned at blower outlet 53 in facing relationship thereto to measure the total pressure at the blower discharge. Transmission tubing 64 has a first end 65 secured to probe 46 and a second end 66 secured to a second end 62 of manometer 48. Inclined manometer 48 is calibrated to compare the total pressure at inlet 33 measured by probe 44 to the total pressure at blower outlet 53 measured by probe 46.

A variable speed blower control assembly 55 of conventional construction is provided to vary the speed of centrifugal blower 42 and thereby control the velocity through the system. The inlet 33 and outlet 53 are designed to have substantially equal areas so that when manometer 48 indicates that the total pressures measured by probes 44 and 46 are in balance the velocity at collector inlet 33 is equal to the natural velocity of the cooling tower exhaust air. This isokinetic condition insures that the drift particles which enter the drift measurement system are truly representative of those entrained in the exhaust air at the sampling point.

In order to accurately represent the total average drift emitted from a cooling tower it is necessary to collect drift samples from various pre-selected points at the fan stack discharge. To facilitate such a test procedure it is necessary that sample collection apparatus 30 be able to traverse the fan stack. To this end, a monorail apparatus 50 is provided including a monorail 70, of square cross section, which traverses fan stack 10. Mono-rail 70 receives a tubular member 72 slideable thereon, which is suitably secured to collector 32 and cyclone separator 34. A conventional pulley system 74 is provided to control back and forth movement of member 72 and collection apparatus 30 attached thereto, from one side of fan stack 10.

It is also important that the plane of collector inlet 33 be positioned perpendicular to the direction of the sample point air flow. To this end, it is necessary to mount mono-rail 70 to fan stack 10 in a manner which permits rotation thereof about a horizontal axis and to provide means to indicate when the plane of collector inlet 33 is perpendicular to the direction of exhaust air flow. Additionally, since drift measurement system 20 will be employed to operate on fan stacks of different diameters it is necessary that the mounting means accommodate such adjustment. Referring to FIGS. 1 and 5, the respective square ends 73 and 76 of mono-rail 70 are received respectively by circular collars 76 and 77. End 73 is slideably received within collar 75 which in turn is rotatably secured to a flange 78, selectively clamped to the fan stack wall in a conventional manner. End 76 is rigidly secured to collar 77 which is rotatably secured within housing 80 of control apparatus 30. Housing 80 is selectively clamped to the fan stack wall in a suitable manner. Rotating means as indicated at 85, of conventional construction, is secured to end 76 and housing 80 to permit selective rotation and locking of mono-rail 70 and collars 75 and 77 relative thereto. Rotating means 85 includes a rod 95 having an upper portion 96 secured to end 76 of mono-rail 70 by U-clamp 97 and a lower portion 98 having a follower member 99 secured thereto. Follower member 99 is received within a semi-circular slot 100 formed in a plate 102 secured to housing 80. Rotation of rod 95 results in rotation of mono-rail 70 and movement of follower 99 within slot 100. Follower 99 includes a conventional locking nut arrangement (not shown) to selectively lock follower 99 in position within slot 100. As best seen in FIGS. 1 and 3, a direction vane 82 is pivotally secured to probe 44 about a substantially horizontal axis. Direction vane 82 includes a rod 83 pivotally secured to probe 44 at one end and secured to a plate 84 at the other end. The exhaust air from fan stack 10 contacting plate 84 causes rod 83 to pivot relative to probe 44 until it reaches an equilibrium position, as seen in FIG. 1. Since the vertical portion of probe 44 extends perpendicular to the plane of inlet 33, the air flow direction at the sample point will be perpendicular to said plane when rod 83 is in longitudinal alignment with said vertical portion of probe 44. The mono-rail 70 is rotated until such condition is achieved and then locked in place.

Referring to FIG. 4, collecting jar 36 is threadedly received by a connecting flange 86 secured to the bottom of cyclone separator chamber 45. Mounted within jar 36 is a funnel shaped member 88 having walls which converge downwardly and inwardly from the top of jar 36 towards the bottom thereof. Extending through member 88 is a hollow tube 90, having a first end 92 positioned within cyclone separator chamber 45 and a second end 94 positioned adjacent the bottom of collection jar 36. Member 88 and tube 90 are effective to minimize evaporation of the collected sample by equalizing the pressure between chamber 45 and jar 36 and eliminating the swirl component of the collected sample.

The hereinbelow described testing procedure is by way of example, as many other testing procedures may be employed to collect drift samples in accordance with the present invention which will accurately represent the total average drift emitted from a cooling tower. The area of the fan stack discharge is divided into five concentric equal area annuli. Drift samples are collected at the center radius of each of these annuli in all four quadrants yielding 20 samples. Sample collection apparatus 30 is positioned at each center radius and positioned such that the plane passing through inlet 33 is perpendicular to the direction of the exhaust air flow. Control apparatus 40 is likewise adjusted at each center radius until isokinetic sampling conditions are achieved. A representative isokinetic sample is allowed to flow through the system and be collected in jar 36 for a predetermined time period; usually from 10 to 20 minutes per sample point. The total drift sample collected is measured and chemically analyzed to determine the dissolved solid content. With the total sample quantity, chemical composition, and sample time known, the weighted average drift emission rate can be evaluated and conveniently calibrated to the flow rate and chemical composition of the water circulating in the cooling tower system.

The hereinabove described method and apparatus is a simple, direct and highly accurate procedure for quantitatively measuring cooling tower drift in the field. It should be understood, of course, that the foregoing disclosure relates to only a preferred embodiment of the invention and that numerous modifications or alterations may be made therein without departing from the spirit and the scope of the invention as set forth in the appended claims.

What is claimed:

1. Apparatus for quantitatively measuring the drift emitted from the fan stack of a cooling tower, comprising:
   a. sample collecting means positioned for collecting a test sample from a point in the fan stack exhaust air;
   b. isokinetic sampling control means in communication with said sample collecting means for establishing the velocity of said collected test sample at substantially equal to the natural velocity of the exhaust air;
   c. cyclone separator means for separating the liquid or solid particles from said test sample, said cyclone separator means including centrifugal blower means having a blower discharge outlet associated therewith;
   d. said isokinetic sampling control having a first total pressure measuring probe positioned adjacent said sample collecting means within the exhaust air and a second total pressure measuring probe positioned adjacent said blower discharge outlet so as to permit control of said blower for balancing the total pressure of the exhaust air at said sampling point with the total pressure at said blower discharge outlet; and
   e. container means for receiving said separated liquid or solid particles.

2. Apparatus in accordance with claim 1 wherein said isokinetic sampling control means further includes manometer means associated with said first and second probes to detect imbalance between the total pressures measured by said first and second probes.

3. Apparatus in accordance with claim 2 wherein said blower means includes speed control means for varying the speed of said blower means and thereby balancing the total pressures measured by said first and second probes.

4. Apparatus for quantitatively measuring the drift emitted from the fan stack of a cooling tower, comprising:
   a. sample collecting means positioned for collecting a test sample from a point in the fan stack exhaust air, said sample collecting means including a hollow sample collecting member having an inlet opening associated therewith, a direction vane means is provided to indicate when the plane passing through said inlet opening is perpendicular to the direction of the sample point air flow;
   b. isokinetic sampling control means in communication with said sample collecting means for establishing the velocity of said collected test sample at substantially equal to the natural velocity of the exhaust air;
   c. cyclone separator means for separating the liquid or solid particles from said test sample; and
   d. container means for receiving said separated liquid or solid particles.

5. Apparatus in accordance with claim 4 wherein said sample collecting member may be rotated about a substantially horizontal axis so as to permit rotation of said inlet opening until said plane passing therethrough is perpendicular to the direction of the sample point air flow.

6. Apparatus for quantitatively measuring the drift emitted from the fan stock of a cooling tower, comprising:
   a. sample collecting means positioned for collecting a test sample from a point in the fan stack exhaust air;
   b. isokinetic sampling control means in communication with said sample collecting means for establishing the velocity of said collected test sample at substantially equal to the natural velocity of the exhaust air;
   c. cyclone separator means for separating the liquid or solid particles from said test sample;
   d. said sample collecting means and said cyclone separator means being positioned upon mono-rail means which extends across said fan stack in a manner which permits them to traverse said fan stack and be selectively positioned therealong; and
   e. container means for receiving said separated liquid or solid particles.

7. Apparatus in accordance with claim 6 wherein said sample collecting means includes a hollow sample collecting member having an inlet opening associated therewith, and said mono-rail means being rotatable about a substantially horizontal axis so as to permit positioning of the plane passing through said inlet opening perpendicular to the direction of the sample point air flow.

8. Apparatus in accordance with claim 7 wherein the respective ends of said mono-rail means are releasably secured to said fan stack by connecting means which permits adjustment of the length of said mono-rails means to accommodate fan stacks of varying diameters.

9. Apparatus in accordance with claim 6 wherein said container means includes a funnel shaped member positioned therein, said member having an upwardly extending tube passing therethrough such that the upper end thereof extends into said cyclone separator means and the lower end thereof extends below said member into said container means, so as to minimize evaporation of said received particles.

10. Apparatus for quantitatively measuring the drift emitted from the fan stack of a cooling tower, comprising:
    a. sample collecting means positioned for collecting a test sample from a point in the fan stack exhaust air;
    b. isokinetic sampling control means in communication with said sample collecting means for establishing the velocity of said collected test sample at substantially equal to the natural velocity of the exhaust air;
    c. cyclone separator means for separating the liquid or solid particles from said test sample; and
    d. container means secured to said cyclone separator means immediately therebelow and in fluid communication therewith for receiving the downward flow of said separated liquid or solid particles.

11. Apparatus for quantitatively measuring the drift emitted from the fan stack of a cooling tower, comprising:
    a. sample collecting means positioned for collecting a test sample from a point in the fan stack exhaust air, said sample collecting means including a hollow sample collecting member having an inlet opening associated therewith, said inlet opening being positioned such that a plane passing therethrough is perpendicular to the direction of the sample point exhaust air flow;
    b. isokinetic sampling control means in communication with said sample collecting means for establishing that the velocity of said collected test sample is substantially equal to the natural velocity of the sample point exhaust air;
    c. cyclone separator means for separating the liquid or solid particles from said test sample, said cyclone separator means including centrifugal blower means having a blower discharge outlet associated therewith;
    d. said isokinetic sampling control means including a first total pressure measuring probe positioned adjacent said sample collecting member inlet and a second total pressure measuring probe positioned adjacent said blower discharge outlet, said first and second probes having manometer means associated therewith to detect imbalance between the total pressures measured thereby;
    e. speed control means associated with said blower means for varying the speed of said blower means and to balance the total pressures measured by said first and second probes;
    f. direction vane means associated with said sample collecting member for indicating when said plane passing through said inlet opening is perpendicular to the direction of sample point air flow; and
    g. container means associated with said cyclone separator means for receiving said separated liquid or solid particles.

* * * * *